United States Patent [19]

Bartrum

[11] 4,187,270

[45] Feb. 5, 1980

[54] EXTRUSION APPARATUS

[75] Inventor: David E. Bartrum, Bay Village, Ohio

[73] Assignee: The B. F. Goodrich Company, Akron, Ohio

[21] Appl. No.: 905,901

[22] Filed: May 15, 1978

Related U.S. Application Data

[62] Division of Ser. No. 818,175, Jul. 22, 1977, Pat. No. 4,118,166.

[51] Int. Cl.² ............................................... B29F 3/10
[52] U.S. Cl. ............................... 264/171; 264/177 R
[58] Field of Search .................. 264/173, 171, 177 R; 425/133.5, 462

[56] References Cited

U.S. PATENT DOCUMENTS

| | | | |
|---|---|---|---|
| 3,559,239 | 2/1971 | Work et al. | 264/171 |
| 3,715,420 | 2/1973 | Kiyono et al. | 264/171 |
| 3,743,143 | 7/1973 | Barney et al. | 264/171 |
| 3,813,199 | 5/1974 | Friesner | 425/462 |
| 3,933,964 | 1/1976 | Brooks | 264/171 |
| 3,959,432 | 5/1976 | Wiley | 425/133.5 |
| 4,015,925 | 4/1977 | Heilmayr | 425/376 R |

*Primary Examiner*—Jeffery R. Thurlow
*Attorney, Agent, or Firm*—Joseph Januszkiewicz

[57] ABSTRACT

An extruder method is taught for forming a co-extruded article wherein the die head of a first extruder forms the primary extrudate which is shaped from a cylindrical form into a thin oblong elongated form. A second extruder feeds its plasticated extrudate to the first extruder die head where the second extrudate is shaped into a thin narrow film for merging the two extrudate into a single elongated composite film for extrusion as an integral film from the die head as a shaped article.

4 Claims, 8 Drawing Figures

EXTRUSION APPARATUS

This is a division of application Ser. No. 818,175 filed July 22, 1977 now U.S. Pat. No. 4,118,166.

BACKGROUND OF THE INVENTION

This invention relates to an extruder and more particularly to a method and apparatus for co-extruding a thin formed thermoplastic sheet.

In the production of a co-extruded article, it was found desirable to laminate plastic film of diverse properties such as low density, high melt index to another material having high density but low melt index. This type of co-extrusion although found more desirable than lamination after separate extrusions had difficulty in bringing the separate melts from different extruders into a common manifold for joining because the equipment was relatively expensive and complex. The present invention overcomes these objections by introducing a separate extruder block which is disposed adjacent the fully formed article prior to the die opening to facilitate the lateral expansion of the second melt onto the lateral expanded first melt. This apparatus and method facilitates its introduction into a system and is particularly effective in applying a cap stock such as the second melt as a thin film over a controlled portion only of the expanded primary melt. Such apparatus facilitates the quick removal of a separate feedblock and returning the extruder to its former single fold function of being a conventional extruder.

SUMMARY OF THE INVENTION

The present invention contemplates a co-extrusion apparatus and method having a first extruder directing its melt into a die head that shapes the cylindrical melt into its general laterally extending oblong flat form or final general shape and thereafter directing a second melt as a thin film onto a selected portion of the first oblong form to form an integral composite sheet substantially in final shape. The composite sheet is given its final form by the orifice opening of the die block.

DETAILED DESCRIPTION

Figure 1:
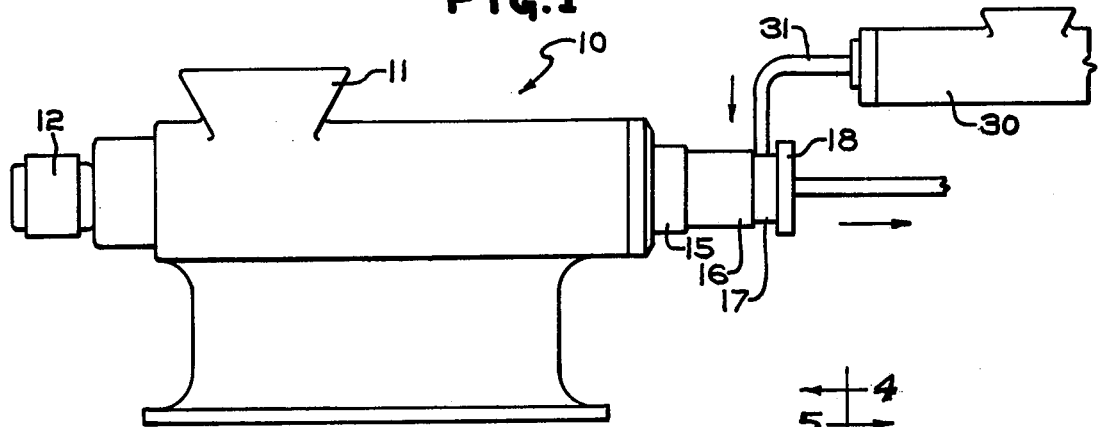
FIG. 1 is a diagrammatic side elevational view of the apparatus in accordance with the invention.
Figure 2:
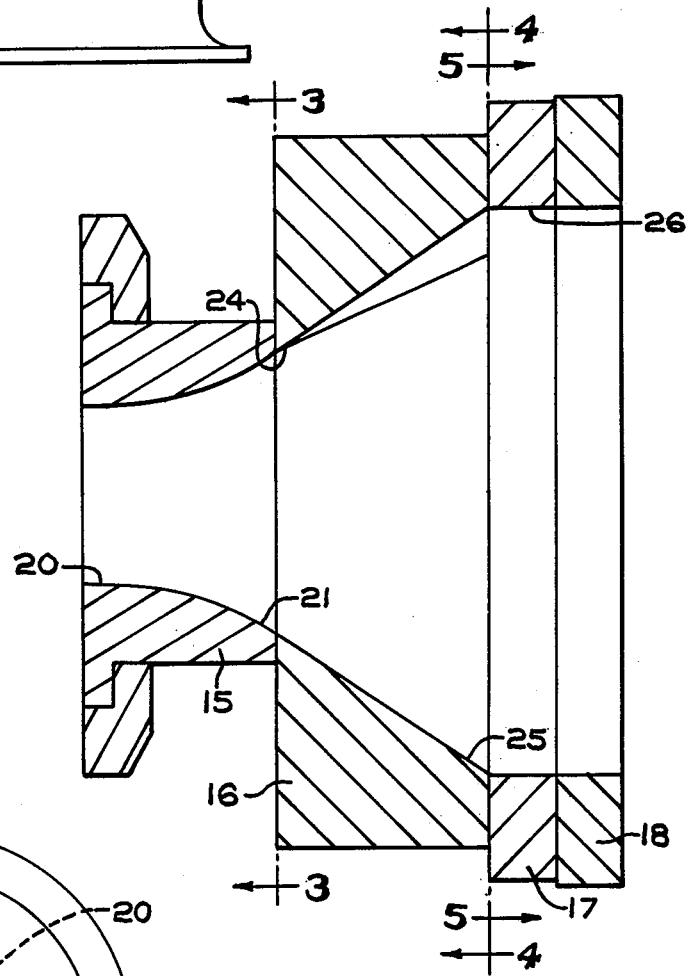
FIG. 2 is a cross section view of the die head shown in FIG. 1.

Referring to the drawings wherein like reference characters designate like or corresponding parts throughout the several views, there is shown in FIG. 1 a primary extruder 10 having a hopper 11, a motor 12 that drives the feed screw not shown in a manner well known in the art. Extruder 10 has forwardly disposed die head comprised of neck block 15, a shaping block 16, a feed block 17, and a die block 18.

The neck block 15 is suitably attached to the forwardly disposed portion of the extruder having a circular bore 20 in one end thereof that merges into an oblong shaped bore 21 at the other end thereof. The bore 20 is of the same size as that of the extruder exit passageway to facilitate the smooth passage of the extrudate therebetween. Disposed forwardly of the neck block 15 is a shaping block 16 which has a forwardly disposed oblong bore 24 at one end thereof mating with the oblong bore 21 of neck block 15. Bore 24 tapers downwardly and laterally outwardly in both directions to form a thin narrow elongated channel 25.

Figure 5:
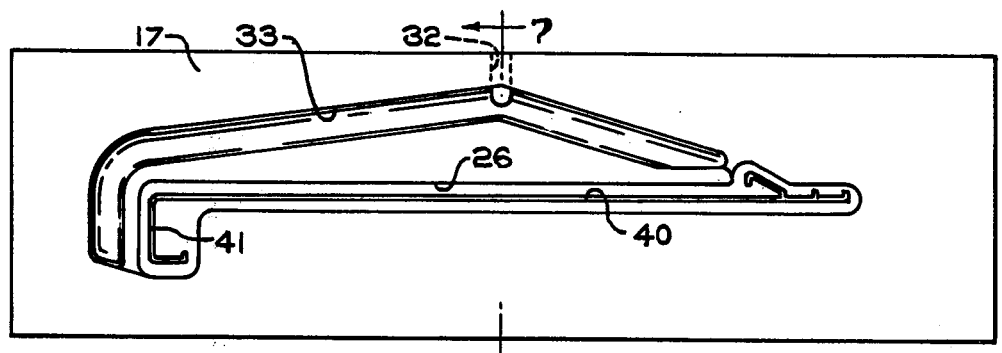
FIG. 5 is a cross sectional view of the die head taken on lines 5—5 of FIG. 2.
Figure 6:
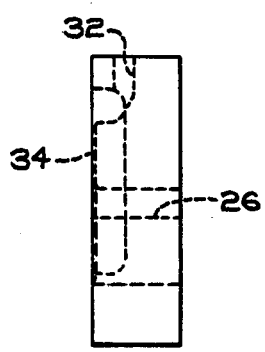
FIG. 6 is end view of the feed block in the die head.
Figure 7:
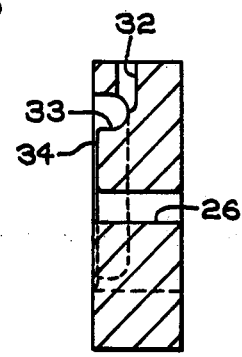
FIG. 7 is a cross sectional view of the feed block taken along lines 7—7 of FIG. 5.
Figure 8:
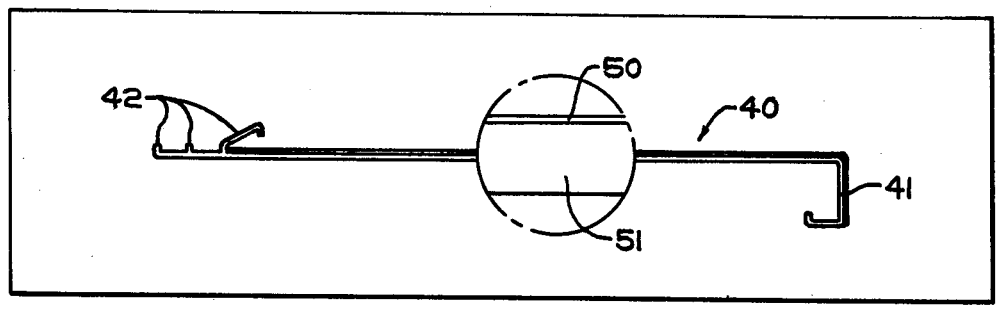
FIG. 8 is a front elevational view of the die head.

Mounted forwardly of the shaping block 16 is a feedblock 17 having at the one end thereof a narrow elongated channel 26 substantially identical to that of elongated channel 25 of shaping block 16. A second extruder 30 having a hopper and motorized feed screw conveys its extrudate via conduit 31 directly to a bore 32 in the upper end portion of feed block 16 to supply a second melt to such feedblock. Bore 32 communicates with a laterally extending distribution channel 33 which tapers downwardly and extends substantially for the full width of elongated channel 26. Distribution channel 33 then communicates via a narrow slit 34 to the elongated channel 26. The narrow slit 34 is formed by recessing the feedback and cooperating such recess with the solid face of shaping block 16 to form slit 34 which acts as a dam to facilitate the distribution of the melt for the full width of the distribution channel 33 to provide an even coating onto the primary melt from the primary extruder passing through passageway 26. Die block 18 as shown in FIG. 8 has an elongated narrow slit aperture or orifice 40 that extends substantially for the full width of the die block and being formed to the shape of the article being extruded. In the example shown the aperture or orifice 40 is formed into the shape of a house siding panel having a lower L-shaped portion 41 at one end thereof, and plurality of projections 42 at the other end thereof, which projections 42 facilitate the attachment to an adjacent siding panel in a manner well known in the art. An enlargement of the aperture in FIG. 8 discloses the extrudate as having a thin cap stock 50 and extrudate body portion 51. The orifice 40 extends rearwardly from the forward portion of the die block, tapers outwardly and merges with the elongated narrow channel 26 in feedblock 17. As seen in FIG. 5 the channel 26 is considerably thicker in dimension than aperture 40.

Figure 3:
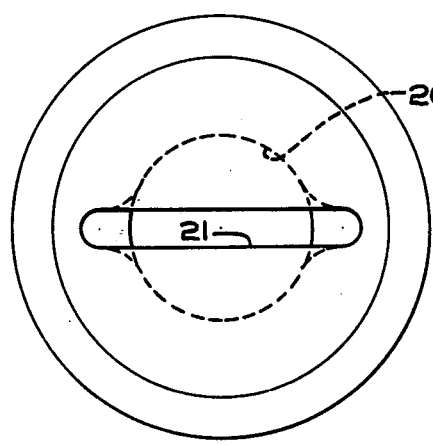
FIG. 3 is a cross sectional view of the die head taken on lines 3—3 of FIG. 2.
Figure 4:
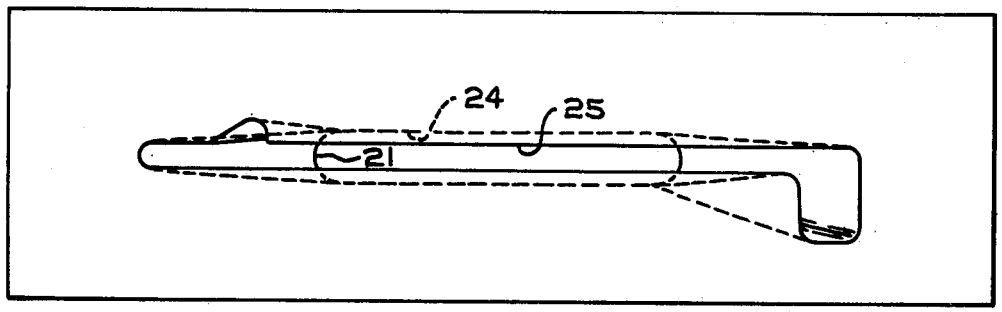
FIG. 4 is a cross sectional view of the die head taken on lines 4—4 of FIG. 2.

In the operation of the apparatus and of the method of the present invention, the extrudate from the primary or first extruder 10 is directed as a cylindrically shaped extrudate to the neck block 15 of the die head. The extrudate is then flattened slightly into a broad oblong form in cross section as depicted by the full lines of FIG. 3. The extrudate then passes from the neck portion 15 to the shaping block 16 which flares out the melt laterally in both directions while reducing the thickness of the melt. As the extrudate passes into the feed block 17 substantially to the final shape except for reduction in thickness, the cap stock from a second extruder is directed into bore 32 of feedblock 17 from the second extruder 30. The cap stock melt is directed via distribution channel 33, and the dam directly below it laterally outwardly to flow as a thin film onto substantially the full width of the extrudate flowing in channel 26 except for one end portion which has the projections 42 thereon. Since such end portion containing the projections 42 is covered in actual use by an adjoining panel, this portion needs no cap stock, which cap stock may be of different colors, different chemical composition and physical properties since it is this portion that is exposed to the weathering elements. Thus as the extrudate issues from the extruder it is formed by the orifice 40 of die block 18 into a house siding configuration having the primary extrudate 51 covered on one side by a thin film cap stock 50 of a different melt.

Various modifications are contemplated and may obviously be resorted to by those skilled in the art without departing from the described invention, as thereinafter defined by the appended claims, as only a preferred embodiment thereof has been disclosed.

I claim:

1. A method of forming a composite multilayer sheet of plastic material comprising the steps of, providing a first plasticized extrudate that is cylindrical in cross-sectional shape, forming said first extrudate into a generally laterally extending elongated cross-sectional configuration, shaping and laterally expanding said extrudate into a generally elongate oblong L-shaped configuration, directing a second extrudate toward said first extrudate, shaping and laterally expanding said second extrudate to the full width of said first elongate L-shaped oblong extrudate, reducing said second laterally expanded extrudate into an elongate thin film substantially along and adjacent to the full width of said first generally elongate L-shaped oblong extrudate, merging said first elongate extrudate with said elongate thin film to form a composite extrudate, and reducing the thickness of the composite extrudate by passing said laterally extending composite extrudate through an extrusion die orifice having a narrow die opening to form an article of substantially the same width as said elongate extrudate of said first extrudate but of reduced thickness.

2. A method of forming a composite multilayer sheet as set forth in claim 1, wherein the ratio of thickness of said thin film of said second extrudate to said composite film is in the range of ratios of from 1 to 8 to 1 to 20.

3. A method of forming a composite multilayer sheet as set forth in claim 2 wherein said composite extrudate on merging is reduced in thickness approximately sixfold.

4. A method of forming a composite multilayer sheet of plastic material comprising the steps of, extruding a first plasticized extrudate into a die head that is cylindrical in a cross-sectional shape, forming said first extrudate into a generally laterally extending elongated cross-sectional configuration, shaping and laterally expanding said extrudate into a generally elongate oblong configuration that is L-shaped, extruding a second extrudate in said die head toward said first extrudate, shaping and laterally expanding said second extrudate in a thin film that is less in its lateral dimension than said L-shaped first laterally expanded extrudate, merging said first laterally expanded elongate extrudate with said second thin film extrudate to form a composite extrudate wherein said thin film covers a portion of said first extrudate, and drawing down said laterally extending composite extrudate through an extrusion die orifice having a thin L-shaped thin orifice to form a house siding panel having said thin film of said second extrudate covering a major portion of one side surface of said house siding panel as a cap stock.

* * * * *